United States Patent
Aalto

(10) Patent No.: US 8,479,758 B2
(45) Date of Patent: Jul. 9, 2013

(54) METHODS AND DEVICES FOR REDUCING WATER CONSUMPTION

(75) Inventor: Juhani Aalto, Espoo (FI)

(73) Assignee: Softatalo Aida Oy, Espoo (FI)

( * ) Notice: Subject to any disclaimer, the term of this patent is extended or adjusted under 35 U.S.C. 154(b) by 698 days.

(21) Appl. No.: 12/716,910

(22) Filed: Mar. 3, 2010

(65) Prior Publication Data

US 2010/0224259 A1 Sep. 9, 2010

Related U.S. Application Data

(60) Provisional application No. 61/157,741, filed on Mar. 5, 2009.

(51) Int. Cl.
*F17D 1/00* (2006.01)

(52) U.S. Cl.
USPC ......... 137/12; 137/883; 137/486; 137/487.5; 137/561 A; 251/208; 251/209; 251/205

(58) Field of Classification Search
USPC .............. 137/12, 14, 883, 486, 487.5, 561 A; 251/208, 209, 205
See application file for complete search history.

(56) References Cited

U.S. PATENT DOCUMENTS

| 2,598,961 | A | * | 6/1952 | Andrus | 137/883 |
| 4,495,968 | A | * | 1/1985 | Kist | 137/624.2 |
| 4,793,375 | A | * | 12/1988 | Marty | 137/270 |
| 4,888,706 | A | * | 12/1989 | Rush et al. | 700/283 |
| 4,946,134 | A | * | 8/1990 | Orlandi | 251/208 |
| 5,004,014 | A | * | 4/1991 | Bender | 137/624.12 |
| 5,460,196 | A | * | 10/1995 | Yonnet | 137/12 |
| 5,967,167 | A | * | 10/1999 | Johnson | 137/14 |
| 6,036,107 | A | * | 3/2000 | Aspen et al. | 239/170 |
| 6,047,729 | A | * | 4/2000 | Hollister et al. | 137/557 |
| 6,260,580 | B1 | * | 7/2001 | Shipley | 137/883 |
| 6,321,782 | B1 | * | 11/2001 | Hollister | 137/557 |
| 6,568,416 | B2 | * | 5/2003 | Tucker et al. | 137/14 |
| 7,201,180 | B2 | * | 4/2007 | Ephrat et al. | 137/14 |
| 2007/0028970 | A1 | * | 2/2007 | Proulx | 137/613 |
| 2007/0158458 | A1 | * | 7/2007 | Wheeler | 239/69 |
| 2010/0096019 | A1 | * | 4/2010 | DiPerna | 137/13 |
| 2011/0146805 | A1 | * | 6/2011 | Foster | 137/2 |

* cited by examiner

*Primary Examiner* — John Rivell
*Assistant Examiner* — Minh Le
(74) *Attorney, Agent, or Firm* — Birch, Stewart, Kolasch & Birch, LLP

(57) ABSTRACT

New methods and devices for reducing water consumption by restricting the supply pressures at the water consumption points.

12 Claims, 4 Drawing Sheets

METHODS AND DEVICES FOR REDUCING WATER CONSUMPTION

This nonprovisional application claims the benefit of U.S. Provisional Application No. 61/157,741 filed on Mar. 5, 2009. The entire contents of the above application is hereby incorporated by reference.

TECHNICAL FIELD

The present invention relates to methods and devices for reducing water consumption.

DISCLOSURE OF INVENTION

It is an object of the present invention to create new methods and devices for reducing water consumption.

According to an aspect of the invention, there is provided a method of reducing water consumption in a water distribution system comprising a water-supply pipe and a plurality of water consumption points connected to the water-supply pipe for water supply at a supply pressure, the method comprising restricting the supply pressures at the water consumption points.

According to another aspect of the invention, there is provided a method of reducing water consumption in a water distribution system comprising a water-supply pipe and a plurality of water consumption points connected to the water-supply pipe, the method comprising providing a plurality of pressure reducing elements between said plurality of water consumption points and said water-supply pipe.

According to a further aspect of the invention, there is provided a water distribution system comprising a water-supply pipe, a plurality of water consumption points connected to the water-supply pipe, and a plurality of pressure reducing elements between said plurality of water consumption points and said water-supply pipe.

According to an even further aspect of the invention, there is provided a consumption control device for a customer branch in a water distribution, the consumption control device comprising a pressure cutting valve to be installed in the customer branch.

Furthermore, the various aspects of the invention provide various embodiments with additional features.

In an embodiment, one of the above-specified methods comprises restricting the supply pressures individually at different water consumption points in order to reduce excess pressures and equalize supply pressures at different water consumption points.

According to another embodiment, one of the above-specified methods comprises, for each of the water consumption points, determining a desired supply pressure level, determining an available supply pressure level, subtracting the desired supply pressure level from the available supply pressure level to obtain a difference, and restricting the supply pressure by producing a pressure drop of a portion of the obtained difference.

According to a further embodiment, one of the above-specified methods comprises obtaining the pressure drop such that said portion is between 50% and 100% of the obtained difference.

According to a further embodiment, one of the above-specified methods comprises obtaining the pressure drop such that said portion is between 75% and 90% of the obtained difference.

According to a further embodiment, one of the above-specified methods comprises using adjustable valves as the pressure reducing elements.

According to a further embodiment, one of the above-specified methods comprises determining settings for each of said adjustable valves, and adjusting the valves according to the determined settings.

According to a further embodiment, one of the above-specified methods comprises using adjustable valves for producing a drop of pressure in water flowing through the valve, determining a desired supply pressure level at the associated water consumption point, determining an available supply pressure level supplied to the adjustable valve, subtracting the desired supply pressure level from the available supply pressure level to obtain a difference, and setting the drop of pressure to be produced by the adjustable valve as a portion of the obtained difference.

According to a further embodiment, one of the above-specified methods comprises selecting the portion between 50% and 100% of the obtained difference.

According to a further embodiment, one of the above-specified methods comprises selecting the portion between 75% and 90% of the obtained difference.

According to a further embodiment, one of the above-specified methods comprises using pressure reducing elements that are adjustable and further obtaining individual settings for each of said pressure reducing elements.

According to a further embodiment, one of the above-specified methods comprises measuring pressure differences over the pressure reducing elements.

According to a further embodiment, one of the above-specified methods comprises controlling the water distribution system on the basis of the measured pressure differences over the pressure reducing elements.

According to a further embodiment, one of the above-specified methods comprises calculating water consumption on the basis of the measured pressure differences over the pressure reducing elements.

According to a further embodiment, one of the above-specified methods comprises adjusting the pressure reducing elements such that the system provides substantially equal supply pressure at each of said plurality of water consumption points.

In an embodiment of the system, the pressure reducing elements are adjustable valves.

According to a further embodiment of the system, the adjustable valves are set according to their individual settings.

According to a further embodiment, the system comprises pressure difference transmitters for measuring pressure differences over the adjustable valves.

According to a further embodiment, the adjustable valves are pressure cutting valves having W-shaped adjustment holes for restricting flow of water.

According to a further embodiment, the system provides substantially equal supply pressure at each of said plurality of water consumption points.

In an embodiment of the device, the pressure cutting valve has a W-shaped adjustment hole for restricting flow of water.

In another embodiment, the device comprises a pressure difference transmitter having a first measuring point within the customer branch before the pressure cutting valve and a second measuring point after the valve.

According to a further embodiment, the device comprises a microprocessor coupled to the pressure difference transmitter and adapted to calculate water flow on the basis of values obtained from the pressure difference transmitter and characteristics of the pressure cutting valve.

BRIEF DESCRIPTION OF DRAWINGS

For a more complete understanding of the present invention and the advantages thereof, the invention is now described with the aid of the examples and with reference to the following drawings, in which.

BEST MODE FOR CARRYING OUT THE INVENTION

Figure 1:
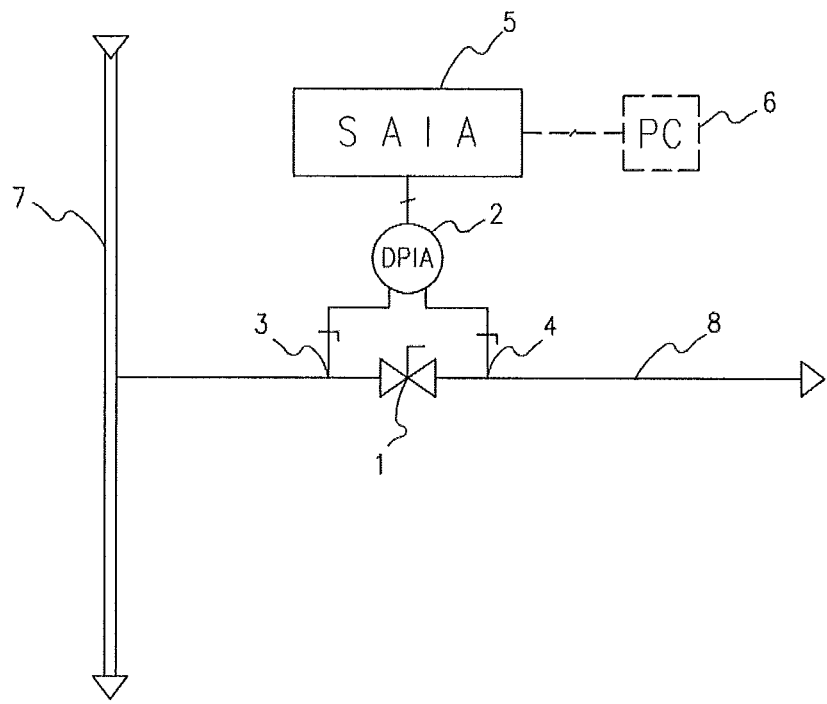
FIG. 1 presents a consumption control device for a customer branch according to an embodiment.

FIG. 1 shows schematically one consumption control device applied to restricting and measuring the flow rate of water in tap water pipelines.

In FIG. 1, the device is installed to a customer branch 8 departing from a pipeline network 7. The measuring device comprises a pressure cutting valve 1 installed to the customer branch 8, a pressure difference transmitter 2 installed substantially close to the pressure cutting valve, having its first measuring point 3 within the customer branch 8 before the pressure cutting valve 1 and a second measuring point 4 after the valve 1, and a microprocessor 5 that is electrically connected to the pressure difference transmitter 2. The figure also shows a microcomputer 6 which has been connected to the microprocessor 5.

Function of the measuring device in the FIG. 1 and the measuring method is based on the fact that while flowing on the customer branch 8, water has to travel through the pressure cutting valve 1. The flow going through the valve 1 causes a pressure difference to the flowing fluid over the pressure cutting valve 1. This pressure difference is measured in the first and second measuring points 3, 4, by the aid of the pressure difference transmitter 2. The measured value received from the pressure difference transmitter 2 is directed to the microprocessor 5, which transforms the measured value into the pressure difference and compares it to a preprogrammed chart to determine the flow rate that corresponds to the pressure difference. This chart is designated for the pressure cutting valve type in question and to the position of the valve with calibration measurements. In the example, the chart is constituted by 20 parallels of pressure difference and stream velocities. In addition to the chart, applicable correction factors can be used for determining the flow rate.

The water cumulative flows for one's part can be measured by integrating the flow rate over time.

In this example the desired measuring inaccuracy is ±1%, and for that reason the pressure difference transmitter 2 has been chosen. Its measuring inaccuracy is below ±0.2%, and in a more accurate embodiment below ±0.1%. The microprocessor 5 in the example is a MT 8b -processor, and the meter's counters are 20 E2PROM-units. This type of memory units endure reliably around 100 000 data logging times, which corresponds to operating life of 114 years if the updating interval is half an hour.

Figure 2:
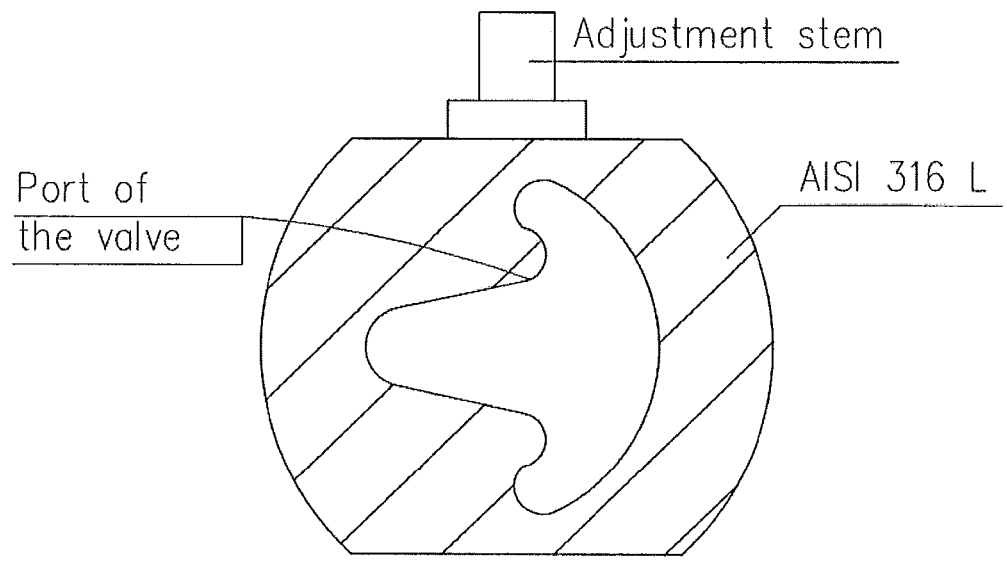
FIG. 2 presents a restricting element of a valve used in the embodiment of FIG. 1.
Figure 3:
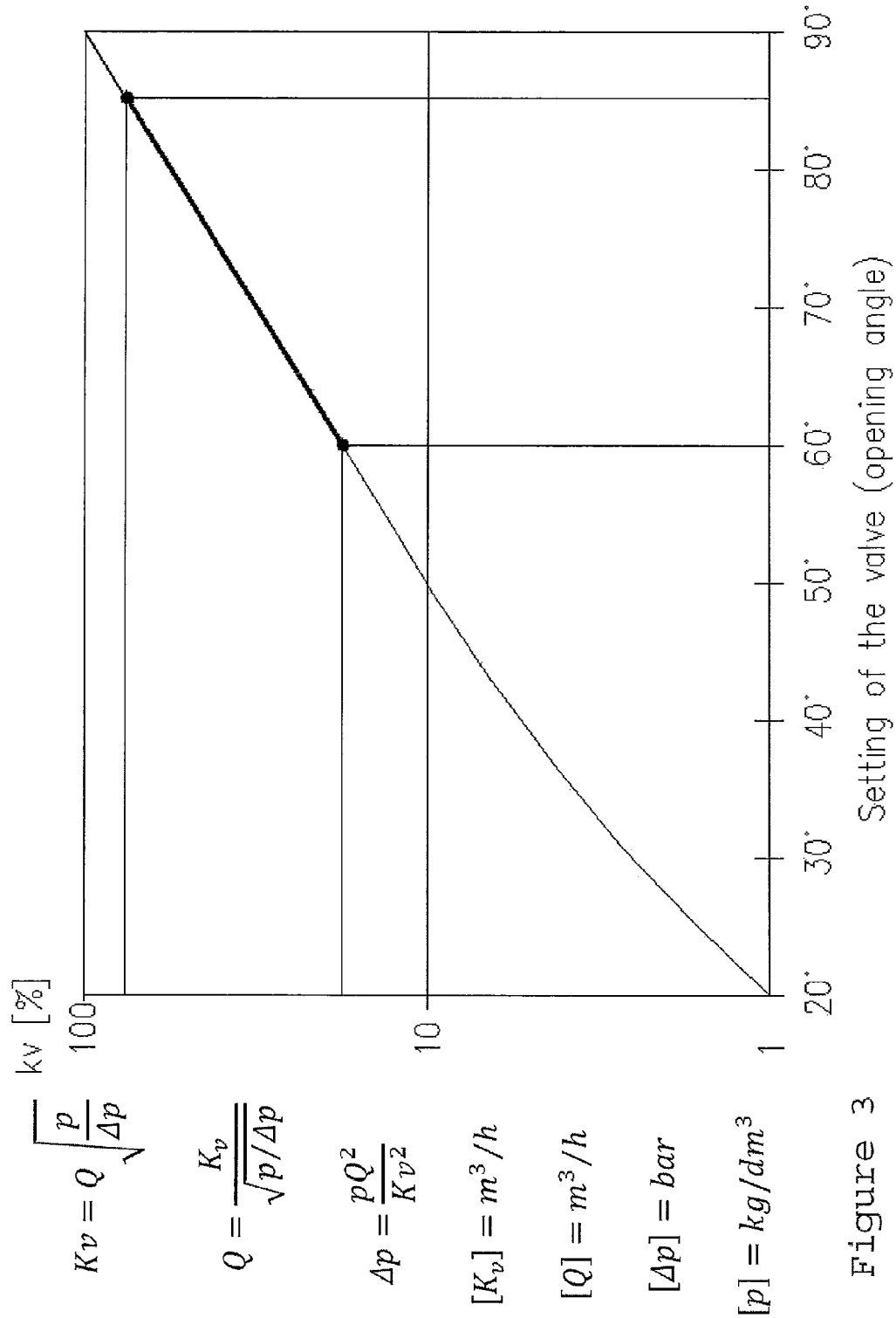
FIG. 3 presents a pressure curve of a valve having a restricting element of FIG. 2.

The measuring device can be calibrated and the comparison chart can be set for example by letting water with a constant velocity run through the pressure cutting valve into a measuring vessel. The pressure difference, the flowing duration and the volume of the fluid flowing through the pressure cutting valve are measured. The bulk of the fluid can be determined either by volume measuring or for example by weighing. Experiments are repeated sufficient number of times with dissenting pressure differences and positions of the pressure cutting valve. The comparison chart is determined by that information. The adjustment hole of the valve is W-shaped, so an appropreate flow in the linear shear surface is achieved within the whole area of operation. See FIG. 2.

In most of the embodiments, the pressure cutting valve 1 is of a type that has a substantially linear resistance of flow diagram within its range of use. Thus the flow through the pressure cutting valve 1 and the pressure difference over it are linearly corresponding, which facilitates accurate interpolation of the measuring values even with relatively few reference points. Resistance diagram of even a good pressure cutting valve 1 conducts naturally unlinearly when the flows are larger or smaller than the designed range of use. According to an embodiment, the resistance of flow of the pressure cutting valve increases steeply when the flow attempts to arise above the designed range of use. This characteristic improves this type of device's ability to cut the excessive flow pulses of the pipeline network even more.

Devices can be used also for measuring the water cumulative flows or flow rates of a fluid flowing within a pipe. This flow rates stands for the quantity of stream flow per unit of time. Specifically the devices that are the subject of the invention are used for measuring water consumption.

Because the structure of the pressure cutting valve is basic and the measuring principle doesn't require any moving parts, the embodiment enables reliable and timely steady devices and measurings. The flow rate of the measured fluid increases at the point of the pressure cutting valve and additionally the shear plane of the valve is sharp, so the measuring device of the invention does not mentionably get dirty when used. The measuring device is also relatively inexpensive and longlife. The valve can be manufactured completely of acid resistant steel, such as AISI 316 L.

In embodiments, it is also possible to centrally observe the rate of flow used by the customers at a monitoring station. This also enables getting information about the momentary flow rates of the water pipeline, and regulation of, for example the pumping stations in the network using this information. Generally, such embodiments facilitate computer-assisted processing of the flow rate measurements.

Thus, by means of some of the embodiments, it easy to process the measuring results of the liquid flow by computer.

The examples represented above can be applied when constructing extensive systems to serve for example a water supply network. Precise and real-time computer-controlled measurements enable developing of advanced leakage controlling and alarm systems as well as energy saving pumping systems into these kinds of structures.

The significance of the embodiments for the pipeline network is to return extra pressure and flow into the main network resulting on savings in both electrical energy relating to the pumping expenses, and water consumption on the network after the valve. The flow increases on the main network resulting as more water in the farthest parts of the network and decreasing scavenging need. The pressure in the network after the pressure cutting valve becomes steady which also leads to decreasing pumping expenses inside the buildings. Additionally the overflow in the lower floors departs, the hydraulic impacts in the network, the noise level and the water consumption all decrease.

Figure 4:
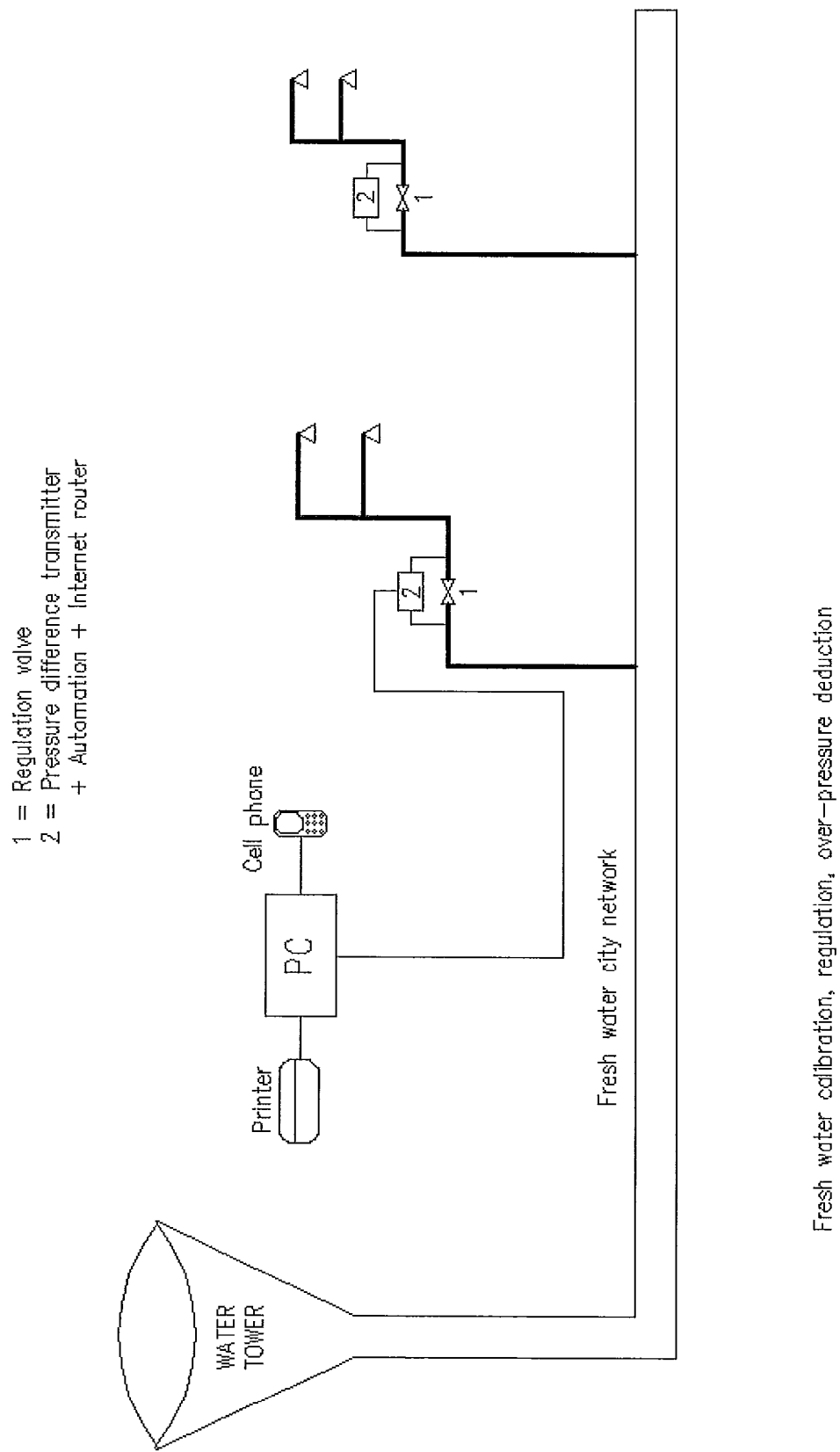
FIG. 4 presents a system according to an embodiment.
Figure 5:
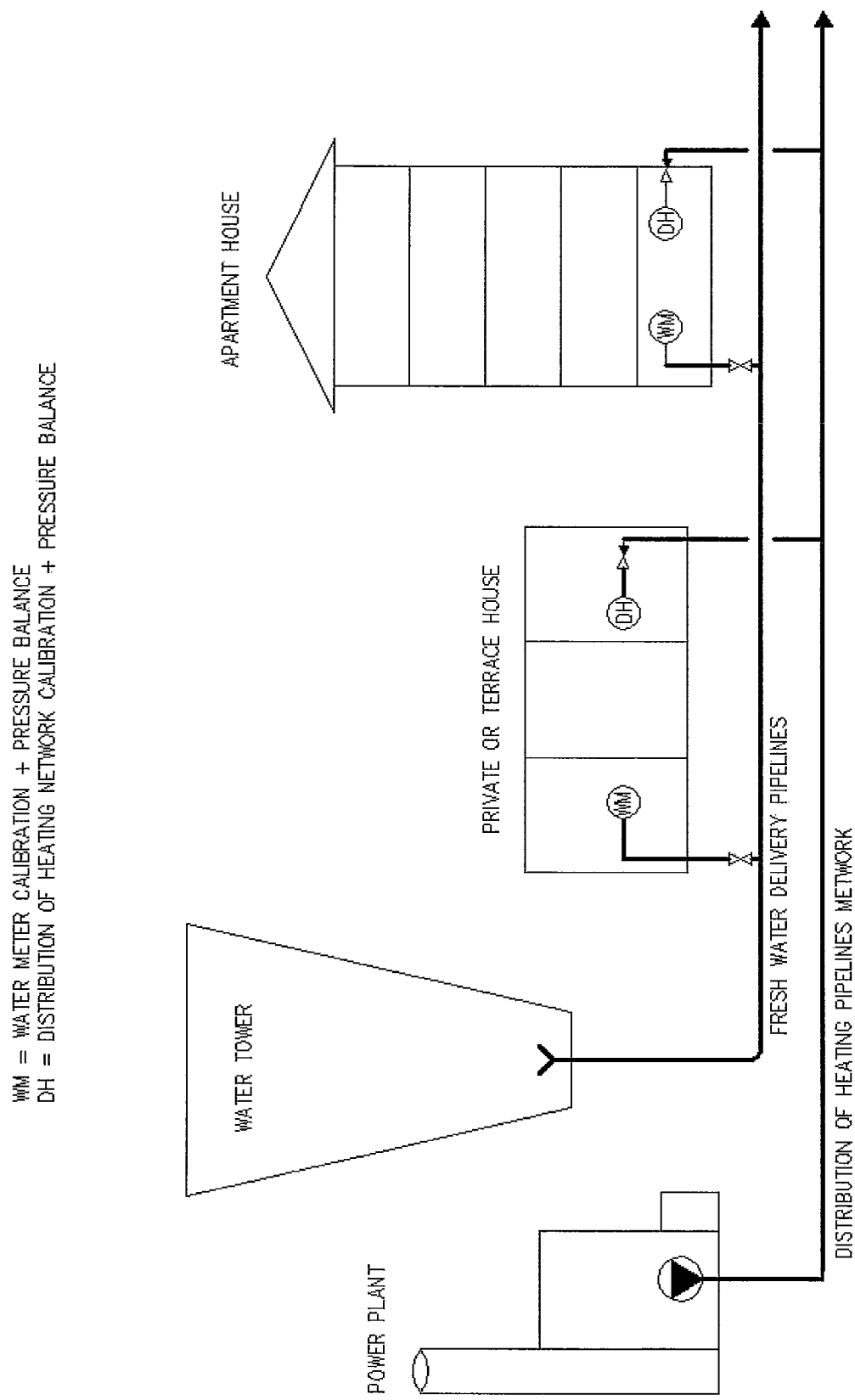
FIG. 5 presents a system according to another embodiment.

With reference to FIGS. 4 and 5, this means that it is possible, for instance, to restrict the supply pressures more at the consumption points WM upstream in the fresh water delivery pipelines than at the consumption points WM downstream in the fresh water delivery pipelines. This arrangement typically equalizes the supply pressures between the consumption points WM located at different distances from the water tower.

With reference to FIGS. 4 and 5, this means also that it is possible to differenciate between different consumption points within the consumption points WM such that the supply pressures at the consumption points locating lower are restrict more than the supply pressures at the consumption points locating higher, such as at higher floors of a tall building. Also this arrangement typically equalizes the supply pressures between the different consumption points located at different heights and distances from the water tower.

Only as an example, if the pressure of the delivery pipeline is 500 units, the tap system takes 170 units of pressure, the supply line of the customer between the delivery pipeline and the tap system takes 60 units of pressure, the height difference between the delivery pipeline and the tap system requires 90 units of pressure, we can calculate that there is a pressure reserve of 500−170−60−90=180 units at the consumption point. Then, an example of an appropriate pressure reduction value at the consumption point could be, for example, between 100 and 180 units, such as 150 units.

The examples presented above can also be applied when constructing extensive systems, for example, for district heating services. Accurate and real-time computer aided measurements make it possible to develop advanced leak observation and alarm systems, and energy saving pumping arrangements for these systems.

The above description is only to exemplify the invention and is not intended to limit the scope of protection offered by the claims. The claims are also intended to cover the equivalents thereof and not to be construed literally.

The invention claimed is:

1. A method of reducing water consumption in a water distribution system comprising a water-supply pipe and a plurality of water consumption points connected to the water-supply pipe for water supply at a supply pressure, comprising
restricting the supply pressures at the water consumption points; and
for each of the water consumption points:
determining a desired supply pressure level,
determining an available supply pressure level,
subtracting the desired supply pressure level from the available supply pressure level to obtain a difference, and
restricting the supply pressure by producing a pressure drop of a portion of the obtained difference.

2. The method of claim 1, comprising restricting the supply pressures individually at different water consumption points in order to reduce excess pressures and equalize supply pressures at different water consumption points.

3. The method of claim 1, wherein the portion is between 50% and 100% of the obtained difference.

4. The method of claim 1, wherein the portion is between 75% and 90% of the obtained difference.

5. A method of reducing water consumption in a water distribution system comprising a water-supply pipe and a plurality of water consumption points connected to the water-supply pipe, comprising
providing the system with a plurality of pressure reducing elements between said plurality of water consumption points and said water-supply pipe, wherein the pressure reducing elements are adjustable valves;
determining settings for each of said adjustable valves; and
adjusting the valves according to the determined settings,
wherein each of said adjustable valves produces a drop of pressure in water flowing through the valve, and the step of determining settings comprises for each of said adjustable valves:
determining a desired supply pressure level at the associated water consumption point,
determining an available supply pressure level supplied to the adjustable valve,
subtracting the desired supply pressure level from the available supply pressure level to obtain a difference, and
setting the drop of pressure to be produced by the adjustable valve as a portion of the obtained difference.

6. The method of claim 5, wherein the portion is between 50% and 100% of the obtained difference.

7. The method of claim 5, wherein the portion is between 75% and 90% of the obtained difference.

8. The method of claim 5, wherein the pressure reducing elements are adjustable and the method comprises obtaining individual settings for each of said pressure reducing elements.

9. The method of claim 5, comprising measuring pressure differences over the pressure reducing elements.

10. The method of claim 9, comprising controlling the water distribution system on the basis of the measured pressure differences over the pressure reducing elements.

11. The method of claim 9, comprising calculating water consumption on the basis of the measured pressure differences over the pressure reducing elements.

12. The method of claim 5, adjusting the pressure reducing elements such that the system provides substantially equal supply pressure at each of said plurality of water consumption points.

* * * * *